H. A. HUMPHREY & W. J. RUSDELL.
METHOD AND APPARATUS FOR RAISING OR FORCING LIQUIDS.
APPLICATION FILED MAY 11, 1912.

1,294,271. Patented Feb. 11, 1919.
6 SHEETS—SHEET 2.

UNITED STATES PATENT OFFICE.

HERBERT ALFRED HUMPHREY, OF LONDON, AND WILLIAM JOSEPH RUSDELL, OF DUDLEY, ENGLAND, ASSIGNORS TO HUMPHREY GAS PUMP COMPANY, A CORPORATION OF NEW YORK.

METHOD AND APPARATUS FOR RAISING OR FORCING LIQUIDS.

1,294,271.     Specification of Letters Patent.     Patented Feb. 11, 1919.

Application filed May 11, 1912. Serial No. 696,639.

*To all whom it may concern:*

Be it known that we, HERBERT ALFRED HUMPHREY, a subject of the King of Great Britain, residing in London, England, and WILLIAM JOSEPH RUSDELL, a subject of the King of Great Britain, residing in Dudley, Worcester, England, have invented a new and useful Improvement in Methods and Apparatus for Raising or Forcing Liquids, of which the following is a specification.

Our invention relates to improvements in method and apparatus for raising or forcing liquids by the expansion of ignited compressed combustible charges.

The purpose of the present invention is to increase the efficiency of such method and means.

Our invention comprises the combination, with other means, as hereinafter described, of a movable rigid body operating between the expansible charge and the liquid, and the novel arrangement of one or more of said movable bodies or pistons in combination with bodies of liquid, expansible charges and elastic cushions.

Our invention also comprises the introduction of automatic cushion controls and liquid and gas inlet throttle controls as herein clearly illustrated, described and claimed.

Referring to the drawings which illustrate, merely by way of example, means suitable for effecting our invention.

Similar numerals refer to similar parts throughout the several views.

Figures 1, 2:
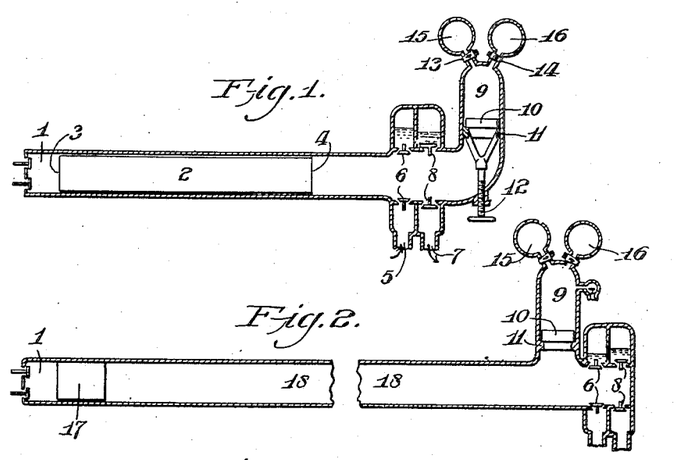
Figure 1 is a diagrammatic vertical section of a device embodying our invention of a solid piston.
Figs. 2, 3, 3ª and 4 are similar views showing modifications.

In Fig. 1, 1 is the combustion chamber of a 2-cycle internal combustion engine, 2 is a solid reciprocating mass, in this case shown as a piston moving in a cylinder so that its end 3 is acted upon by the expanding gases and its end 4 acts upon the liquid to be raised or forced. 5 is the inlet for the supply liquid communicating with the supply valves 6; and 7 is the outlet for the liquid delivered under pressure and communicating with the delivery valves 8. An air vessel 9 is separated from the supply liquid by a float or piston 10 which may be arrested by an adjustable resilient stop 11 whereof the position may be varied by turning the screw 12. Communicating with 9 through cocks 13 and 14 are additional air vessels 15 and 16, the cocks serving the purpose of cutting off or establishing communication as required. The operation follows:—On ignition of the compressed combustible charge in the combustion chamber 1, piston 2 is forced forward and acquires momentum. The liquid rising in vessel 9 carries up the float 10 and compresses the elastic cushion in 9 and also in 15 and 16 if the cocks 13 and 14 are open, until the pressure is that at which valves 8 open and the further movement of piston 2 then causes liquid to be delivered under pressure until the piston comes to rest and valves 8 close. The expansion of the compressed elastic cushion in 9, and it may be in 15 and 16, causes a reverse movement of the piston 2 and during this movement a fresh combustible charge which has been introduced into chamber 1 by any of the known methods used in 2-cycle gas engines is compressed and fresh liquid is introduced through valves 6. The introduction of the fresh liquid may be due to a diminution of pressure caused by the continuous movement of the piston after the pressure of the elastic cushion has fallen low enough or the float 10 has been arrested, by the stop 11. The ignition of the fresh combustible charge in chamber 1 now starts a fresh cycle. It will be seen that in this case before liquid is raised or forced energy is stored by compressing an elastic cushion to a definite pressure, depending on the pressure at which liquid is delivered and therefore this stored energy may remain constant independently of the amount of work done in delivering liquid. The float 10, stop 11, and auxiliary air vessels 15 and 16 may all be dispensed with, but they constitute a valuable means of varying the operations in accordance with the conditions to be met. Thus, for higher liquid delivery pressures smaller elastic cushions may be used to store the energy, or the initial pressure of the elastic cushion may be increased to approach nearer the pressure at which the valves 8 open. Under an otherwise fixed set of conditions, if cocks 13 and 14 are closed a given movement of the float 10 will cause a more rapid rise of pressure so that the movement of piston 2 will cause delivery of liquid to begin at an earlier part of the power stroke. Inasmuch as some of the liquid raised or forced may follow the movements of piston 2 it may be regarded as reciprocating with 2 but though this may be inevitable we do not regard this liquid as necessarily constituting an essential portion of the mass which reciprocates and we intentionally make this distinction since any such liquid may be of comparatively small mass and its inertia effects unimportant in connection with the present example.

The apparatus will work somewhat differently if the working cycle in chamber 1 is a 4-stroke cycle, for then following the power stroke on which liquid is delivered there will be a return stroke due to the expansion of the elastic cushion in 9 and during this stroke fresh liquid will be taken in and an elastic cushion purposely retained in chamber 1 will be compressed. Such cushion may consist of scavenging air or burnt products and the expansion of the cushion will give a second outstroke storing energy in chamber 9 and causing the intake of a fresh combustible charge into chamber 1. The fresh charge will then be compressed on the second return stroke due to the expansion of the cushion in 9. In such case the strokes may be of unequal length.

In Fig. 2 the reciprocating mass is composed of a solid piston 17 and the liquid contained in the pipe 18. Other parts are numbered to correspond with Fig. 1. As in the previous example the power stroke first stores energy in an elastic cushion and then delivers liquid through valve 8, but the cycle or cycles as a whole need not be repeated.

Figure 3:
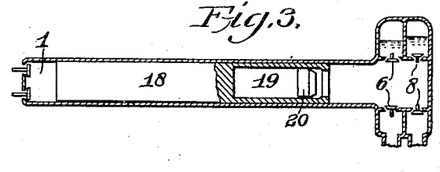
Figure 3A:
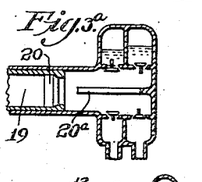

In Fig. 3 the elastic cushion which is compressed is contained in the cylindrical chamber 19 situated inside the piston 18 and is separated from the liquid by a piston 20 which slides with sufficient tightness in the chamber 19 the latter being open at the right hand side as shown. The principle of action remains unaltered but in this case the elastic cushion which is compressed before liquid is delivered is situated inside the moving piston 18 and it is the expansion of this cushion which gives the required return movement. The cycle in chamber 1 may be a 2-stroke or 4-stroke cycle. Fig. 3$^a$ shows a modification in which the elastic cushion 19 is initially compressed to at least the pressure at which liquid is delivered consequently at the power stroke when the piston 18 moves to the right liquid is first delivered and then when piston 20 reaches the projection 20$^a$ the motion of piston 20 is arrested and the continued motion of piston 18 causes further compression of the cushion 19 until the reciprocating masses are brought to rest.

Figure 4:
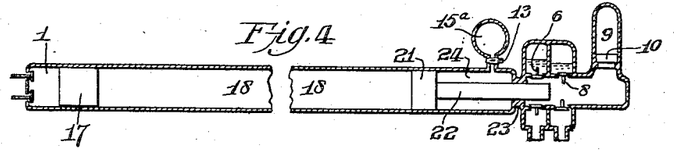
Figure 5:
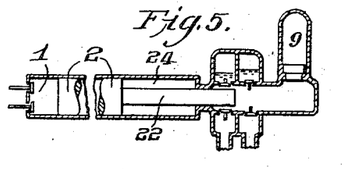
Figs. 5, 6, 7 and 8 are similar views on a reduced scale, showing further modifications.

In Fig. 4 are shown a solid piston 17 and a second solid differential piston composed of the parts 21 and 22, the latter forming a ram which passes through a gland 23 to act upon the liquid to be raised or forced. Between the pistons 17 and 21 is a column of liquid in the pipe 18 constituting part of the reciprocating mass which together acquire the necessary momentum to carry through the cycle. Acting on the differential face of the piston 21, 22, is an elastic cushion contained in 24 and 15$^a$ so that the energy stored during an outward stroke from the combustion chamber may be stored partly in the last mentioned elastic cushion and partly in air vessel 9. The provision of the part of the cushion in 15$^a$ is for purposes of regulation. Fig. 5 differs from Fig.

4 in that one solid mass is substituted for the composite solid and liquid mass and is shown in the figure as a solid piston 2 attached to a ram 22. In this case there are two elastic cushions 24 and 9.

Figure 6:
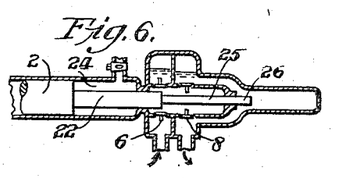

Fig. 6 shows a useful modification comprising an additional ram 25 attached to and smaller than the ram 22 and adapted to be acted upon at its end 26 by the high pressure liquid. On a power stroke piston 2 moves to the right and delivers liquid past valve 8 owing to the difference in diameter between the parts 22 and 25. The return stroke is produced by the pressure of the high pressure liquid on the end 26 of ram 25 and during this stroke liquid will be taken in past the liquid supply valves 6. There may in addition be energy stored in an elastic cushion 24, but this is not essential.

Figure 7:
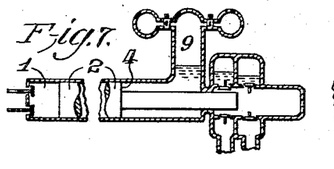
Figure 8:
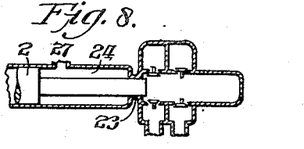

Fig. 7 differs only from Fig. 5 in that the face 4 of piston 2 works against liquid and forces the liquid to rise in the vessel 9 to compress an elastic cushion and store energy. In this case energy is stored and liquid delivered simultaneously during the working stroke. In Fig. 8 piston 2, in moving to the right, first drives elastic fluid through a port 27 and then, this port being closed by the piston, an elastic cushion is compressed in the space 24, the end of the cylinder being closed around the gland 23 for this purpose.

Figure 9:
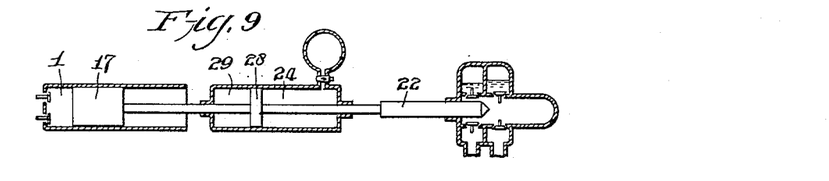
Figs. 9, 10 and 11 are vertical sections of devices employing a plurality of pistons connected by a common piston rod.

In Fig. 9 the engine is of the two-cycle type and an elastic cushion consisting of combustible mixture is constituted in the combustion chamber 1 to arrest the reciprocating masses when moving to the left. A separate piston 28 attached to a common piston rod reciprocates in a separate cylinder to store energy on the outward stroke by compressing an elastic cushion in the space 24 to the right of the piston and by creating a partial vacuum in the space 29 to the left of the piston, the cylinder having closed ends for this purpose.

Figure 10:
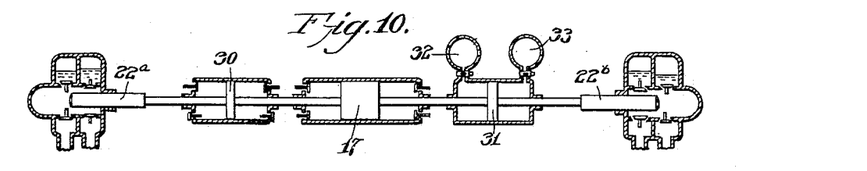

Fig. 10 shows an arrangement in which a double acting engine with its piston 17 is connected on the left hand side with a double acting pump for elastic fluid having a piston 30 for supplying scavenging air or combustible mixture or both to the engine. On the right the engine is connected with a cushion cylinder with a piston 31 and having auxiliary cushion chambers 32 and 33 connected near the ends of the cylinders through cocks which may be adjusted. Linked to the common piston rod which joins the pistons 30, 17 and 31 are two rams 22ª and 22ᵇ operating to raise or force liquid.

Figure 11:
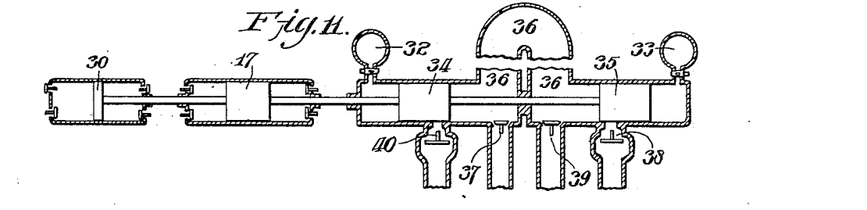

In Fig. 11 there are shown four linked pistons 30, 17, 34 and 35. The piston 30 belongs to a double acting pump for elastic fluids; 17 is the power piston of a double acting engine, and between pistons 34 and 35 there is a mass of liquid contained in the pipe 36. This mass of liquid is reciprocated with the pistons and acquires momentum so that when the solid pistons which are linked together are restrained by the compression of elastic cushions toward the end of their stroke the mass of liquid in the pipe 36 tends to continue its movement. Thus, if the solid pistons have made a stroke to the right and have uncovered the delivery port of valve 38 the effect of the momentum of the liquid column will be to cause liquid to be taken in past liquid supply valve 37 and to be delivered past the delivery valve 38. On the next stroke the opposite effect occurs and liquid will be taken in at the inlet valve 39 and delivered at valve 40. If the pistons 34 and 35 are not arranged to close automatically the ports 38 and 40, then non-return valves must be fitted to control the delivery ports as shown. There may be elastic cushions formed in the closed ends of the cylinders in which the pistons 34 and 35 reciprocate, and these cushions may have adjustable auxiliary cushions 32 and 33 for the purpose of control. The use of the bent pipe 36 permits a comparatively large volume of liquid to be used and yet permits the pistons 34 and 35 to be close together.

Figure 12:
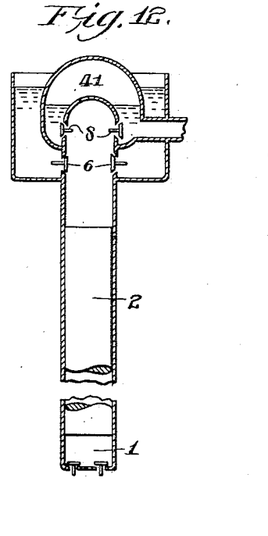
Figs. 12 and 13 are vertical sections, showing the combustion chamber and play pipe vertically arranged.

Fig. 12 shows a useful variation in which the solid piston 2 reciprocates vertically, the combustion chamber 1 being below this piston. The liquid supply valves 6 and the liquid delivery valves 8 are placed at the upper end of the cylinder and there is shown an air vessel 41 in connection with the valve box containing the delivery valves 8. The cycle in the combustion chamber 1 is assumed to be a 2-stroke cycle and the elastic cushion which is compressed on each downward movement of the piston is the combustible mixture which is ignited to give the next power stroke. In this case the raising of the solid piston 2 supplies the energy for giving the downward reciprocation.

Figure 13:
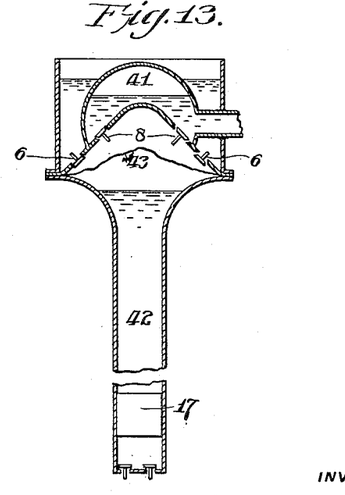

A useful variation of the form shown in Fig. 12 is illustrated in Fig. 13, where the reciprocating mass is composed partly of the solid piston 17 and partly of liquid in the vertical pipe 42 above the piston. Between the top of this liquid and a flexible diaphragm 43 there may be a quantity of elastic fluid as indicated, and above the diaphragm there is liquid in contact with the delivery valves 8 and the liquid supply valves 6.

The flexible diaphragm is tightly held at its circumference and moves in the manner of diaphragm pumps at each reciprocation of the piston 17 so that when the reciprocating masses move downward liquid is taken in through the valves 6 and when the masses move upward liquid is delivered through valves 8.

Figures 14, 15, 16, 17, 18:
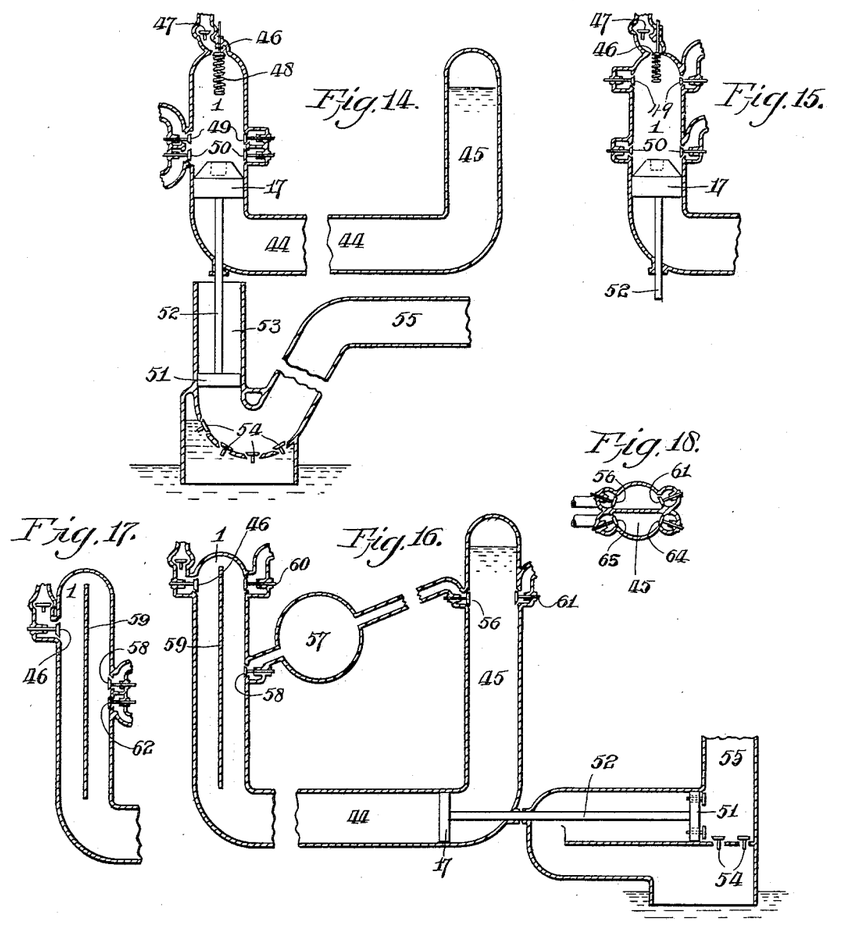
Figs. 14, 16 and 19 are vertical sections of devices employing pistons connected with the piston working in the play pipe, for doing external work.
Fig. 15 is a vertical section of the combustion chamber of apparatus shown in Fig. 14, with modification in inlet and outlet valves.
Fig. 17 is a vertical section of the combustion chamber of apparatus shown in Fig. 16, with modification in the valves.
Fig. 18 is a horizontal section of pipe 45 of apparatus shown in Fig. 16, provided with a vertically extending partition.

Figs. 14 to 19 refer to pumps in which a solid piston is reciprocated to give a continuous flow of the liquid column in one direction, the momentum of the moving column being sufficient to continue its movement between the forwarding impulses. In Fig. 14, 1 is the combustion chamber for a two-stroke cycle, and 17 is a solid piston separating the combustion products from liquid which reciprocates in the pipe 44, a portion of which, 45, is vertical and has its end closed at the top to contain an elastic cushion. Energy is stored on the outstroke from the combustion chamber partly by raising liquid in 45 and partly by the compression of an elastic cushion in the top of 45 and this stored energy gives the return stroke which exhausts burnt products from and compresses the fresh combustible charge in chamber 1. At the top of chamber 1 there is fitted an exhaust valve 46 and a non-return valve 47. Valve 46 opens under its own weight and is closed by the action of piston 17 pressing the spring 48 on the upward stroke. Valves 49 and 50, placed at suitable levels around the combustion chamber walls, admit gas and air respectively, in this case by suction after expansion has occurred to atmospheric pressure and the piston 17 has uncovered these valves. On the return stroke due to the energy stored in the vertical pipe 45 the combustible mixture moves upward with the piston 17 and the hot exhaust gases are delivered past valves 46 and 47 until contact between the piston 17 and the spring 48 shuts valves 46. The combustible charge then in the chamber is compressed and its ignition starts a fresh cycle. External work is done by the reciprocation of the piston 51 attached to the piston 17 by the rod 52. As piston 51 reciprocates in cylinder 53 the downward stroke causes liquid inlet valves 54 to close and an impulse is given to the column of liquid in pipe 55. On the upstroke of piston 51 liquid enters through valves 54 and flows partly to follow the piston 51 and partly to follow the liquid moving in pipe 55, so that a continuous flow is maintained in the latter. For operating the combustion chamber on a 4-stroke cycle there is fitted to chamber 1 as shown in Fig. 15 valves 49 for combustible mixture and valves 50 for scavenging air. The exhaust valves 46 and 47 are numbered as before. In this case at the end of the expansion stroke valves 49 are locked shut and valves 50 open to admit scavenging air. On the first return stroke exhaust gases are discharged past valves 46 and 47 and an elastic cushion of scavenging air is compressed after the exhaust valve 46 is shut. The expansion of this elastic cushion gives the second outward stroke in which valves 49 are permitted to open and admit mixture while valves 50 are locked shut by any suitable means not shown. On the second return stroke the fresh charge is compressed and ignition starts a fresh cycle.

In Fig. 16 the 4-cycle combustion chamber 1 connects through play pipe 44 with a vertical portion of the pipe 45 in which liquid is raised and an elastic cushion compressed; but on the power stroke the first effect of the liquid rising in 45 is to deliver scavenging air through valve 56 into a reservoir 57 under slight pressure so that toward the end of expansion the air may enter past valve 58 and drive out some burnt products through the exhaust valve 46. The combustion chamber is divided by a partition 59 the top part of which does not extend to the top of the chamber but the lower part of which is always dipping in liquid so that at the end of the expansion stroke there will be scavenging air on the right hand side of the partition and burnt products on the left hand side of the partition. Valve 56 was shut by the liquid and the last part of the movement of the liquid compressed the elastic cushion entrapped in the top of 45. The expansion of this cushion now gives a return movement of the liquid in 44 toward the combustion chamber, valve 58 is shut by the rising liquid, and the remainder of the burnt products, and it may be some of the scavenging air, are driven out past valves 46 until the liquid shuts this valve also. The air cushion then remaining constitutes an elastic cushion which is compressed and in expanding causes the second outstroke and draws in a fresh combustible charge through the gas or combustible mixture inlet valve 60 and the compression of the fresh charge thus introduced is given by the second return stroke due to the expansion of the compressed elastic cushion in 45. During the downward movement of liquid in 45 which follows the power stroke valve 56 is locked shut and a fresh charge of air is drawn in through valve 61 as the liquid passes this valve, which shuts under the action of its spring when suction ceases. It is generally advisable to lock valve 56 shut by any suitable means not shown so that no air may escape on the second outward stroke from the combustion chamber. In this case there is no piston in the combustion chamber but the liquid which reciprocates in 44 and 45 causes the reciprocation of a piston 17, the motion of which is transmitted by rod 52 to piston 51 shown pierced by ports fitted with non-return valves and adapted to pass liquid when the piston 51 moves to the left. There are also liquid inlet valves 54, and 55 is the pipe in which a column of liquid flows continually in one direction.

For operating the combustion chamber shown in the last example on a 2-stroke cycle a suitable modification is shown in Fig. 17 where in addition to valve 58 for scavenging air there is a valve 62 for gas or combustible mixture; the latter also being supplied under slight pressure by a device similar to that described in connection with Fig. 16 for scavenging air. In order that the liquid rising in 45 may serve the purpose of pumping separately air and gas there may be a vertical partition 63 shown in sectional plan in Fig. 18 extending to the top of 45. On one side of this partition there is an inlet valve 61 and an outlet valve 56 for air and on the other side of the partition there is an inlet valve 64 and an outlet valve 65 for gas. The latter is connected through a reservoir similar to 57 so that gas may be discharged through valve 62 of Fig. 17 into the combustion chamber. When expansion of burnt products occurs in the combustion chamber and the pressure therein approaches atmospheric pressure, exhaust valve 46 opens and then first scavenging air begins to enter through valve 58 and a little later gas enters through valve 62 so that at the end of the outward stroke there is a combustible mixture on the right hand side of the partition 59. On the return stroke, more exhaust gases are discharged through valve 46 and the combustible mixture is compressed in the top of chamber 1 and the ignition of the charge starts a fresh cycle.

Figure 19:
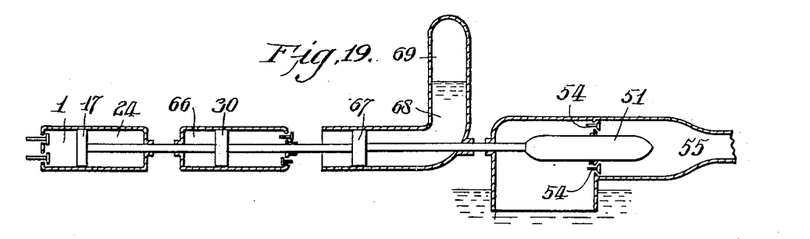

In Fig. 19 the ram 51 which gives continuous movement to a column of liquid in pipe 55 is linked to piston 17 of a 2-cycle engine having a combustion chamber 1. A pump piston 30 is also linked to the common piston rod and in this case is shown as a single acting pump to deliver combustible mixture to chamber 1 through an external receiver not shown. On the power stroke an elastic cushion is compressed in the space 24 to the right of the piston and a partial vacuum is produced in the space 66 behind the pump piston 30 and the energy stored in these is utilized to produce the return stroke and to take in combustible mixture to the right of piston 30. Another way of storing energy for the return stroke is to fit a piston 67 to the common rod which joins the solid reciprocating masses and to permit piston 67 to move before it on its outward stroke a quantity of liquid 68 and to compress the elastic cushion in the space 69 above this liquid. In this case the liquid mass 68 forms part of the mass which reciprocates. It is unnecessary further to multiply examples of the kind where the movement of the reciprocating masses gives rise to the continuous flow of a liquid column in one direction.

Figures 20, 21:
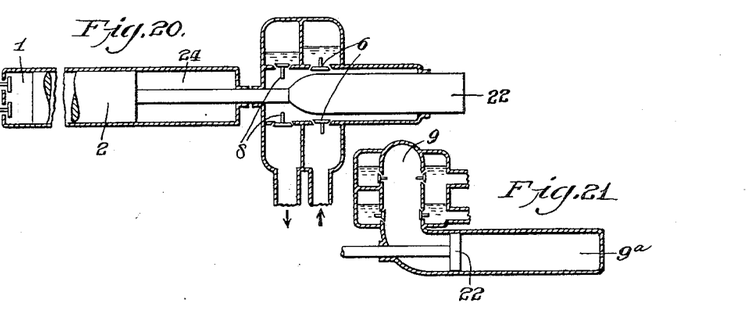
Figs. 20 and 21 are vertical sections showing further modifications of the structure shown in Figs. 1 to 9 inclusive.

Fig. 20 shows an arrangement in which a solid reciprocating piston 2 is attached by a rod to a ram 22 in such manner that when the piston 2 moves to the left liquid is delivered through valves 8 and when it moves to the right liquid is taken in through valves 6. This arrangement is suitable where the greater part of the work in raising or forcing the liquid is due to a suction lift and permits the greater portion of the work to be done on the power stroke while the lesser work of delivering liquid through the valves 8 is done on the return stroke due to the energy stored in the elastic cushion 24.

In Fig. 20 there is shown no elastic cushion in connection with the ram chamber, but in Fig. 21, the piston 22 compresses an elastic cushion $9^a$ on the outstroke and an elastic cushion 9 on the instroke so that a part or the whole of the cushion energy is thus stored. This is a better arrangement when the cycle in chamber 1 is a four-stroke cycle.

Figures 22, 23:
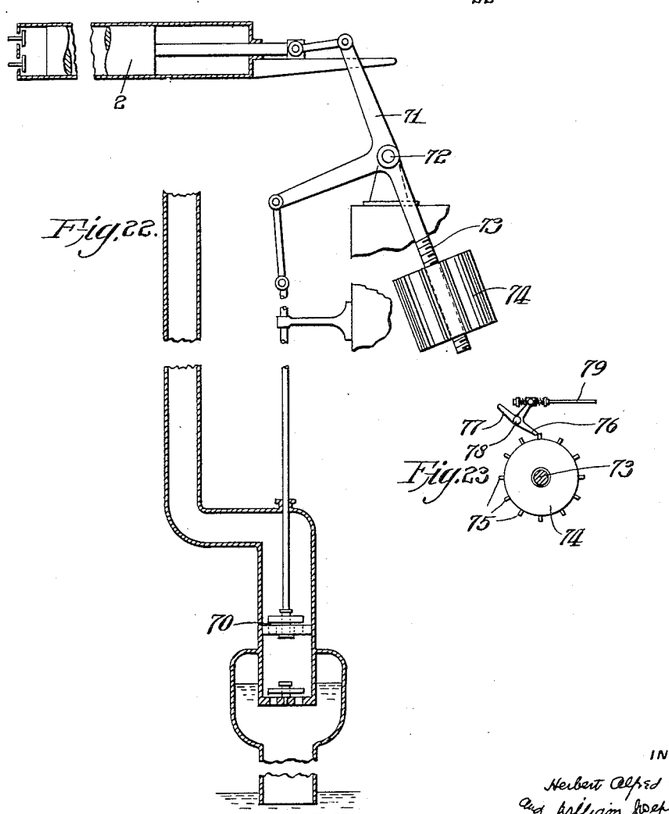
Fig. 22 is a vertical section of a device employing a piston operated pump or plunger with a pivoted weight connected between the piston and plunger.
Fig. 23 is a plan view showing means for adjusting the position of the weight on its pivoted supporting arm.

It is not necessary that the pistons which reciprocate as a part of the moving masses should be rigidly connected, and Fig. 22 shows an arrangement in which the piston 2 of the power unit is linked to a piston or plunger 70 of the liquid raising unit of a well known type through suitable rods and cranks. The example shown is applicable to a case where liquid is to be raised from a low level such as from a well, and the liquid raising portion is placed at a considerably lower level than the power unit. Interposed between the pistons 2 and 70 is a bell-crank 71 oscillating on a pivot 72 and carrying an arm 73 on which a weight 74 is secured by an adjustable means such as a screw. It will be obvious that if the weight 74 is moved nearer the pivot 72 its moment of inertia about the pivot will be decreased and when other operating conditions are constant the effect will be to increase the number of cycles in a given time. The position of weight 74 may be automatically controlled by means of the device illustrated in Fig. 23 where the weight 74 is shown in plan with a number of projections 75 arranged circumferentially which are adapted to be engaged by one or other of the pawls 76 or 77, fixed together and movable about pivot 78 by any suitable controlling device. Thus if 79 is a lever from some control device such as one of those presently to be described, and is moved to the right it will cause pawl 76 to engage with the teeth 75 as the weight 74 oscillates in relation to the fixed pivot 72 and will turn weight 74 clockwise on the arm 73. If the control rod 79 is moved to the left pawl 77 will engage with the teeth 75 so as to rotate weight 74 in a counter-clockwise direction on arm 73. The control mechanism is worked by means not shown such as a float actuated by the rise and fall of the level of the supply liquid or of the delivery liquid or by pressure changes in the apparatus or by any device hereinafter described for controlling the pump. By such means the pump is made to operate more rapidly if the level of the liquid supply rises or the level of the liquid delivery falls so as to maintain approximately constant levels, or to prevent variations beyond desired limits. It will be observed that there is a position of the pawls 76, 77 in which neither of them engages the teeth and consequently where the reciprocation of the weight 74 continues without moving the weight on the arm 73.

Figure 24:
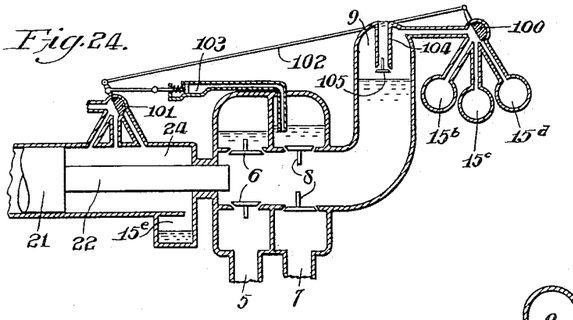
Fig. 24 is a vertical section showing apparatus having means for automatically varying the volumes of the air cushions.

Reference has already been made to the means of controlling the operation of the pump, and some of these will now be described. In Fig. 24, 21 is a solid reciprocating piston, 22 a ram for forcing liquid, and 24 is a space in which an elastic cushion is compressed by the differential piston 21, 22. Connected with the cushion 9 are three separate vessels $15^b$, $15^c$, $15^d$, and the communication between these vessels and cushion 9 is controlled by a rotating valve 100. Another rotating valve 101 controls communication between the atmosphere and different parts of the space 24, and in the example shown the rotating valves 100, 101 are linked together by a rod 102. 103 is a device in which the pressure of the liquid raised or forced acts upon a piston loaded by a spring so as to move the rod 102 to the left as the liquid delivery pressure rises. By this movement valves 100, 101, are rotated in such a manner that the cushion compressed in the space 24 is decreased in volume and that compressed in space 9 and one or more of the vessels $15^b$, $15^c$, $15^d$, increased in volume. The effect of this is to permit energy to be stored in the space 24 at a later part of the stroke and to allow a larger volume of elastic fluid to be compressed in the cushion 9 and its connected cushions. Assuming that the same energy is developed on a power stroke when piston 21, 22 moves to the right, then as the pressure of liquid delivered rises the effective elastic cushions may be so proportioned that the length of stroke and the total energy stored may both remain constant. For example, less energy will be stored in the space 24 where the cushion is smaller and more energy will be stored in the cushion 9 and its connected cushions but liquid will begin to be delivered later through valves 8 so that the total energy in work done remains the same for the same length of stroke. Either or both of valves 100, 101, can be operated separately by any other controlling device not shown such as an inertia governor, a governor controlled by the velocity of the liquid in any part of the apparatus, by pressure changes during the cycle by variation of level of the liquid raised or forced, or by varying the lengths of stroke.

There is shown depending in the space 9, Fig. 24, a pipe 104 communicating with the atmosphere at its upper end and fitted with a valve 105 at its lower end adapted to be closed by the rising liquid or any equivalent means not shown. When it is closed by the liquid as shown in the figure there will be at the moment of closing atmospheric pressure in the space 9 and the vessels which communicate therewith. If now liquid is used to displace some of the elastic fluid in such communicating vessels the volume of cushion compressed will be decreased, and by controlling the amount of such liquid the energy stored in the cushion may be varied. Similarly vessel $15^e$ communicates with the space 24 and in this vessel the amount of liquid can be varied to alter the total cushion volume.

Figure 25:
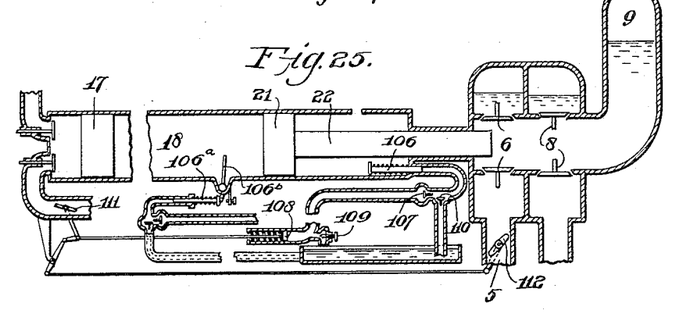
Fig. 25 is a similar view of apparatus having means for automatically throttling the combustible charge, inlet and also the liquid inlet.

In Fig. 25 is shown a device by means of which varying lengths of stroke operate to control the pump. The plunger 106 of a small pump is normally maintained in the position shown by a spring and is adapted to be acted upon by the piston 21 so that when the piston meets the plunger the further movement of the piston forces liquid past valve 107 to act upon a spring loaded piston 108 and to move the latter to an extent which is greater for a greater movement of the plunger. Liquid is allowed to escape constantly at a rate which can be adjusted by valve 109 and the liquid passing this valve may be returned to be used again. As the piston 21 commences a movement to the left the spring on plunger 106 returns the plunger to the left thus drawing fresh liquid past valve 110. The liquid escaping past valve 109 permits the piston 108 to be moved to the right under the action of its spring. The control obtained from this device is as follows:—If the stroke of piston 21 increases the plunger 106 will be moved farther to the right and piston 108 will be moved farther to the left, thus rotating the throttle valve 111 which governs the inlet of combustible mixture to the combustion chamber and by partially closing it causes less combustible mixture to be taken in for producing the next working stroke, thus providing less energy and tending to keep the length of stroke constant. The amount of escape of liquid past valve 109 may be adjusted so that throttle 111 only opens slowly after being partially closed and so that the throttling effect persists until it is utilized. If the piston 108 also operates through suitable links a throttle valve 112 in the liquid suction pipe 5 a greater stroke of the piston 21 will tend to cause the throttle valve 112 to be opened wider and a smaller stroke will tend to close this valve. The effect of closing the valve is to increase the degree of suction through valves 6 and thus to permit the elastic cushion in 9 to expand to a greater degree when piston 21 moves to the left, the effect being that when piston 21 moves to the right again there is a greater volumetric change in the cushion 9 before liquid is delivered through valves 8 and consequently piston 21 will on the next stroke move farther. Thus the device tends to equalize the strokes of the piston 21.

There is also illustrated in Fig. 25 another plunger 106ª adapted to be operated by the movement of a plate 106ᵇ which projects into the mass of reciprocating liquid so that it is deflected by the movement of the liquid to a greater or less degree depending upon the velocity at which the liquid is passing it. Thus the stroke of the plunger 106ª will be greater at each reciprocation of the liquid if the velocity of the moving liquid increases. Plunger 106ª acts as a small pump for supplying liquid to act on the piston 108 to produce the effects already described as due to liquid supplied by the plunger 106. Thus the plunger 106ª may be used instead of the plunger 106 or the two may work in combination.

Figure 26:
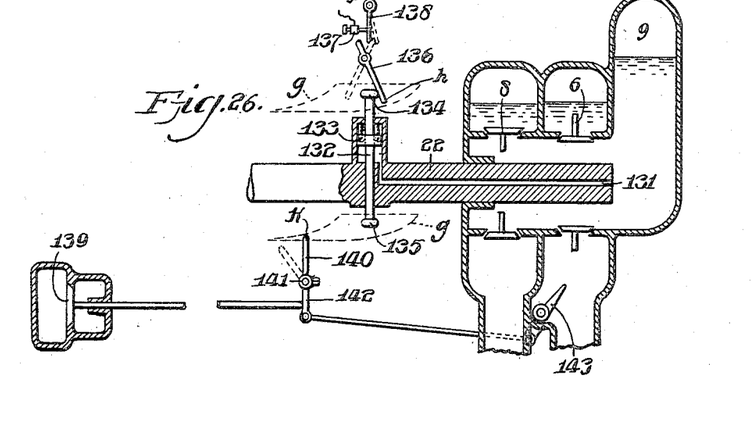
Fig. 26 is a vertical section of apparatus having automatic means for stopping or controlling the pump in case of failure of the valves to operate properly.

Fig. 26 shows a safety device for stopping or controlling the pump should one or more of the valves for liquid delivery or liquid intake fail to close at the correct time. In this case the ram 22 for raising liquid is shown pierced by an aperture 131 which permits liquid to pass from the right hand end of the ram to the small cylinder 132 in which there is a spring loaded piston 133. At the ends of a rod attached to piston 133 are tappets 134, 135 and a typical indicator card such as would be drawn out by a pencil attached to the tappets is shown dotted at $g\ g$. At a point $h$ in the upper of the diagrams the pressure has fallen low enough to permit the tappet 134 to escape contact with the lever 136 while the ram 22 is moving toward the combustion chamber in normal working, but should one of the non-return delivery valves 8 fail to close, liquid delivered might flow back and maintain the pressure in the ram chamber, thus keeping the tappet 134, which is at this time on the other side of lever 136, raised sufficiently to strike the lever 136 and break electrical connection between the contact stop 137 and a stiffly pivoted lever 138. If the circuit thus broken is the ignition circuit the pump will be stopped. Again, there is shown fitted to the combustion chamber an additional exhaust valve 139 which is adapted to be opened to allow the escape of gases under pressure at the beginning of a power stroke and so reduce the power of the stroke should one or more of the liquid suction valves fail or if from any other cause the pressure in the cushion 9 should not rise during the power stroke. Thus, at the point $h$ the tappet 135 will in normal working fail to engage a crank lever 140 pivoted on the same pivot 141 which carries a lever 142, but should the pressure not rise then tappet 135 will engage lever 140 and by turning it to the right will move the link and rod which opens valve 139. The lever 140 is on each return stroke moved into the dotted position and returned by a spring not shown as soon as engagement with the tappet 135 ceases. The exhaust valve 139 can also be opened by means of a pivoted plate 143 placed in the suction pipe 5 in such a position that any liquid flowing in the wrong direction, that is, downward in pipe 5, will act upon the plate to revolve it to the right and so open valve 139.

Figure 27:
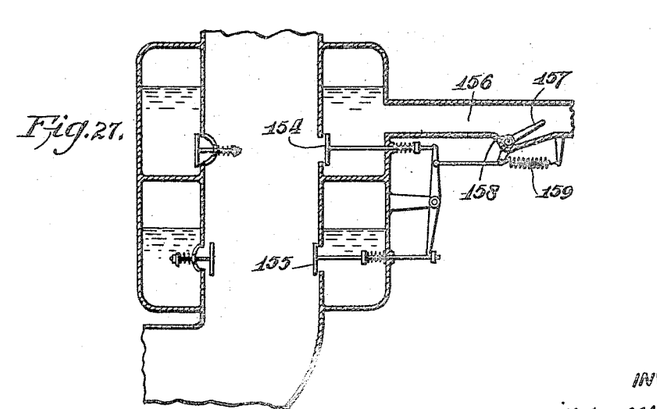
Fig. 27 is a detail in part section of means for maintaining the apparatus in operation when it would otherwise stop through failure of ignition, or by cause of too feeble explosion.

In order that a pump of the type in question may be maintained in operation when through failure to ignite a combustible charge or through a more feeble explosion than usual the pump would otherwise stop, there is, as shown in Fig. 27, fitted in the liquid raising or forcing portion, an auxiliary delivery valve 154, and an auxiliary suction valve 155 controlled by springs which normally tend to keep these valves open. There is shown in the liquid delivery pipe 156 a plate 157 adapted to be acted upon by the liquid so that when there is much liquid flowing the plate 157 will be moved to the right about pivot 158, such movement, by means of the link shown, maintaining valves 154, 155 closed and therefore they are inoperative. Should the velocity of liquid in the delivery pipe 156 fall, a spring 159 will move the plate 157 toward the vertical position. This movement will unlock the valves 154, 155, so that they may be opened by their respective springs and then on the liquid delivery stroke valve 154 may remain open and allow liquid to return under the pressure of delivery to cause or assist a return stroke of the reciprocating masses and the compression of a fresh combustible charge. In similar manner on the next power stroke some liquid will be returned through the suction valve 155 until the velocity of the liquid shuts this valve against the action of its spring. By this means the return stroke is assisted at the expense of liquid flowing backward and thus the cycle of operations continues until normal conditions are again established.

What we claim is:—

1. The method of raising or forcing liquid, by the energy of a primary medium, having high initial pressure and subsequent expansive force, acting upon a rigid piston having a variable stroke interposed between the primary medium and an accumulator, which consists in effecting the power stroke of the piston by said primary medium to store energy in the accumulator, permitting said stored energy to become effective in connection with the return stroke of the piston, and effecting the intake and discharge of liquid simultaneously with the movements of said piston.

2. The method of raising or forcing liquid, by the energy of a primary medium, having high initial pressure and subsequent expansive force, acting upon a rigid piston having a variable stroke interposed between the primary medium and an accumulator, which consists in effecting the power stroke of the piston by said primary medium to store energy in the accumulator, permitting said stored energy to become effective in connection with the return stroke of the piston, utilizing the said return stroke to compress the primary medium, and effecting the intake and discharge of liquid simultaneously with the movements of said piston.

3. The method of raising or forcing liquid which consists in causing an expanding medium to act upon a piston in one direction, and an accumulator to act upon said piston in the reverse direction, causing said piston to reciprocate and by its inertia and momentum to store and give out energy, said piston operating as an actuator in relation to the primary medium, as a pump piston in relation to the liquid and as an accumulator piston in relation to the accumulator, to effect the intake and discharge of liquid simultaneously with its movements.

4. A method of pumping fluid by means of an actuator interposed between an elastic prime medium, having high initial pressure and subsequent expansive force, and an accumulator, which consists in causing the expansion of said medium to effect the power stroke of said actuator; in causing the accumulator piston of said actuator to store energy in said accumulator during said power stroke of said actuator; in permitting said energy to effect the return stroke of said actuator; and in causing the pumping element of said actuator to effect the intake and discharge of fluid to and from the chamber in which said pumping element moves, simultaneously with the movements of said actuator.

5. A method of pumping fluids by means of an actuator interposed between a compressed elastic prime medium, having high initial pressure and subsequent expansive force, and an accumulator, which consists in causing the expansion of said medium to effect the power stroke of said actuator; in causing the accumulator piston of said actuator to store energy in said accumulator during said power stroke of said actuator; in permitting said energy to effect the return stroke of said actuator; in causing the said return stroke to effect the compression of a fresh charge of said medium; and in causing the pumping element of said actuator to effect the intake and discharge of fluid to and from the chamber in which said pumping element moves, simultaneously with the movements of said actuator.

6. A method of pumping fluids which consists in causing an expanding prime medium to act upon an actuator in one direction, and an accumulator to act upon said actuator in the reverse direction, thus causing said actuator to oscillate, and, by its inertia and momentum, to store and give out energy; said actuator including a power piston in operative relation to said prime medium, a pump piston, and an accumulator piston in operative relation to said accumulator; in causing the pumping element of said actuator to effect the intake and discharge of fluid to and from the chamber in which said pumping element moves, simultaneously with the movement of said actuator; in causing said medium to expand to relatively low pressure; in exhausting said prime medium and in admitting a new charge of said prime medium in preparation for the next power impulse thereof.

7. A method of pumping fluids which consists in causing an actuator, consisting of a power piston which is in operative relation to an expanding prime medium, and is operatively connected to a pump piston, and to an accumulator piston which is in operative relation to an accumulator, to oscillate by power impulses from said expanding prime medium acting upon said power piston and by the reaction of said accumulator acting upon said accumulator piston; in causing the pumping element of said actuator to effect the intake and discharge of fluid to and from the chamber in which said pumping element moves, simultaneously with the movement of said actuator; in expanding said prime medium to relatively low pressure, in exhausting said prime medium in admitting a new charge of said prime medium and in causing the reaction of the accumulator and the momentum of said actuator to compress said prime medium in preparation for the next power impulse thereof.

8. A method of pumping fluids which consists in causing an actuator, consisting of a power piston which is in operative relation to an expanding prime medium and is operatively connected to a pump piston, and to an accumulator piston which is in operative relation to an accumulator, and a body of liquid in operative relation to said accumulator piston and to said accumulator, to oscillate by power impulses from said prime medium acting upon said power piston and by the reaction of said accumulator upon said body of liquid and accumulator piston; in causing the momentum of said actuator and of said body of liquid to absorb and to give out energy during each oscillation thereof; in causing the pumping element of said actuator to effect the intake and discharge of fluid to and from the chamber in which said pumping element moves, simultaneously with the movements of said actuator; in expanding said prime medium to low pressure, in exhausting said prime medium, in admitting a new charge of said prime medium, and in causing the movement and momentum of said actuator and said body of liquid due to the reaction of said accumulator, to compress said prime medium in preparation for the next power impulse thereof.

9. A method of pumping fluid in which a single-acting prime mover actuated in one direction by an expanding prime medium is used to operate a pump piston to draw in and discharge fluid by the displacement caused by said piston, which consists in causing a portion of the energy of the power stroke of said prime mover to operate an accumulator piston and to store energy in an accumulator with which said accumulator piston is in operative relation, in causing said stored energy to effect the return stroke of said accumulator piston, pump piston and prime mover, and to compress a new charge of said prime medium in preparation for the next power stroke of said prime mover, and in causing the pumping element of said actuator to effect the intake and discharge of fluid to and from the chamber in which said pumping element moves, simultaneously with the movement of said actuator, whereby said intake and discharge are each effected simultaneously with interchanges of energy between said prime mover and said accumulator.

10. A method of pumping fluid which consists in causing the power stroke of a single-acting power piston actuated by an expanding prime medium to operate a pump piston which is in such operative relation to a pump chamber as to draw in fluid to be pumped while said pump piston is moving in one direction and to discharge said fluid while said pump piston is moving in the opposite direction, and simultaneously to operate an accumulator piston which is in operative relation to an accumulator; in causing said movement of said operative parts simultaneously to perform work in said pump chamber and to store energy in said accumulator; in causing energy so stored in said accumulator to react upon said accumulator piston, said pump piston and said power piston and effect the return stroke thereof; in causing the movement of said operative parts during said return stroke simultaneously to perform work in said pump chamber and to compress a new charge of said prime medium; and in causing the pumping element of said actuator to effect the intake and discharge of fluid to and from the chamber in which said pumping element moves, simultaneously with the movement of said actuator, whereby said intake and discharge are each effected simultaneously with the transmission of energy in each direction between the power piston and the accumulator.

11. An apparatus for pumping fluids comprising in combination a power cylinder adapted to use an elastic prime medium having pressure and expansive force; a power piston adapted to work therein; an accumulator in operative relation to said power piston, said accumulator being of a type adapted to absorb energy during the power stroke of said piston and to give out energy during the return stroke of said piston, and a pump consisting of a pump chamber, provided with a valved inlet and a valved discharge outlet, and a pump piston operatively connected with said power piston and said accumulator, and adapted to work in said pump chamber, said pump chamber being constructed as an inclosed chamber with rigid walls and ends and with interior boundaries consisting of the interior surfaces of said walls and ends and valves and the exposed surface of said pump piston.

12. An apparatus for pumping fluids comprising in combination an internal combustion cylinder; a power piston adapted to work therein; an accumulator in operative relation to said power piston, said accumulator being of a type adapted to absorb energy during the power stroke of said piston and to give out energy during the return stroke of said piston, and a pump consisting of a pump chamber, provided with a valved inlet and a valved discharge outlet, and a pump piston operatively connected with said power piston and said accumulator, and adapted to work in said pump chamber, said pump chamber being constructed as an inclosed chamber with rigid walls and ends and with interior boundaries consisting of the interior surfaces of said walls and ends and valves and the exposed surface of said pump piston.

HERBERT ALFRED HUMPHREY.
WILLIAM JOSEPH RUSDELL.

Witnesses:
JOSEPH MILLARD,
W. J. MERTEN.